US010270660B2

(12) United States Patent
Kliger et al.

(10) Patent No.: US 10,270,660 B2
(45) Date of Patent: Apr. 23, 2019

(54) FUNCTION VIRTUALIZATION FOR MULTIMEDIA NETWORK TOPOLOGY ADAPTATION

(71) Applicant: Avago Technologies General IP (Singapore) Pte. Ltd, Singapore (SG)

(72) Inventors: Avi Kliger, Ramat Gan (IL); Philippe Klein, Jerusalem (IL); Xuemin Chen, Rancho Santa Fe, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 723 days.

(21) Appl. No.: 14/704,119

(22) Filed: May 5, 2015

(65) Prior Publication Data

US 2016/0301573 A1 Oct. 13, 2016

Related U.S. Application Data (60) Provisional application No. 62/145,558, filed on Apr. 10, 2015.

(51) Int. Cl.
*H04L 5/00* (2006.01)
*H04L 12/24* (2006.01)
(Continued)

(52) U.S. Cl.
CPC ........ *H04L 41/0896* (2013.01); *H04L 5/0037* (2013.01); *H04L 41/5054* (2013.01);
(Continued)

(58) Field of Classification Search
CPC ............. H04L 41/0896; H04L 12/2801; H04L 41/5054; H04L 65/1026; H04L 47/781;
(Continued)

(56) References Cited

U.S. PATENT DOCUMENTS 5,539,882 A * 7/1996 Gopal ................... H04L 12/403
340/4.21
5,594,726 A * 1/1997 Thompson ............. H04H 20/79
348/E7.049
(Continued)

OTHER PUBLICATIONS

Multimedia over Coax Alliance, MoCA MAC/PHY Specification v1.0, MoCA-M/P-SPEC-V1.0-02082011, Feb. 8, 2011, pp. 1-167, United States.

(Continued)

*Primary Examiner* — Andrew Lai
*Assistant Examiner* — Chuong M Nguyen
(74) *Attorney, Agent, or Firm* — Morgan, Lewis & Bockius LLP (57) ABSTRACT

A network architecture includes a gateway that terminates broadband service at a particular location, e.g., at the entry to a house or business. The gateway may execute a MoCA network controller (NC) that manages a network of MoCA nodes connected by cable connections. The gateway distributes content to the MoCA nodes on the network, using a logical star topology over the physical tree topology connections. The NC allocates greater downlink (gateway to MoCA node) bandwidth compared to uplink (node to gateway) bandwidth. Because the gateway terminates the broadband service, the network architecture frees very significant spectrum over the cable connections, permitting, for instance, the transmission of hundreds of Mbps of broadband content streams to the MoCA nodes.

19 Claims, 10 Drawing Sheets (51) Int. Cl.
*H04L 29/06* (2006.01)
*H04L 12/911* (2013.01)
*H04L 27/26* (2006.01)
*H04L 12/28* (2006.01)
*H04L 29/08* (2006.01)

(52) U.S. Cl.
CPC .......... *H04L 47/781* (2013.01); *H04L 47/829* (2013.01); *H04L 65/1016* (2013.01); *H04L 65/1026* (2013.01); H04L 5/0007 (2013.01); H04L 12/2801 (2013.01); H04L 27/2601 (2013.01); H04L 41/509 (2013.01); *H04L 65/1033* (2013.01); *H04L 67/32* (2013.01)

(58) Field of Classification Search
CPC ... H04L 5/0055; H04L 47/829; H04L 41/509; H04L 27/2601
See application file for complete search history.

(56) References Cited

U.S. PATENT DOCUMENTS

| | | | | |
|---|---|---|---|---|
| 9,729,917 | B2* | 8/2017 | Ford | H04L 12/2801 |
| 2010/0142540 | A1* | 6/2010 | Matheney | H04L 12/2801 |
| | | | | 370/400 |
| 2010/0238932 | A1* | 9/2010 | Kliger | H04L 12/4633 |
| | | | | 370/392 |
| 2010/0246586 | A1* | 9/2010 | Ohana | H04L 1/1874 |
| | | | | 370/400 |
| 2011/0010749 | A1* | 1/2011 | Alkan | H03H 1/00 |
| | | | | 725/127 |
| 2011/0113455 | A1* | 5/2011 | Wu | H04L 12/2801 |
| | | | | 725/82 |
| 2013/0201316 | A1* | 8/2013 | Binder | H04L 67/12 |
| | | | | 348/77 |
| 2015/0120863 | A1* | 4/2015 | Wu | H04L 67/28 |
| | | | | 709/217 |
| 2015/0163167 | A1* | 6/2015 | Liu | H04L 47/828 |
| | | | | 370/230 |
| 2016/0173396 | A1* | 6/2016 | Wu | H04L 12/2836 |
| | | | | 370/238 |

OTHER PUBLICATIONS

Multimedia over Coax Alliance, MoCA MAC/PHY Specification v2.0, MoCA-M/P-SPEC-V2.0-20100507, Jun. 8, 2010, pp. 1-315, United States.

Monk, Anton, et al., The Multimedia Over Coax Alliance, Proceedings of the IEEE, May 22, 2013, pp. 1-17, Institute of Electrical and Electronics Engineers, New York, NY.

* cited by examiner

FUNCTION VIRTUALIZATION FOR MULTIMEDIA NETWORK TOPOLOGY ADAPTATION

PRIORITY CLAIM

This application claims priority to provisional application Ser. No. 62/145,558, filed Apr. 10, 2015, which is entirely incorporated by reference.

TECHNICAL FIELD

This disclosure relates to network topologies. This disclosure also relates to adapting MoCA network topologies, optionally using network function virtualization.

BACKGROUND

The processing power, memory capacity, available disk space, and other resources available to processing systems have increased exponentially. Computing resources have evolved to the point where a single physical server may host many instances of virtual machines and virtualized functions. Each virtual machine typically provides virtualized processors, memory, storage, network connectivity, and other resources. At the same time, high speed data networks have emerged and matured, and now form part of the backbone of what has become indispensable worldwide data connectivity, including connectivity to virtual machine hosts. Improvements in virtualization will drive the further development and deployment of virtualized functionality.

DETAILED DESCRIPTION

Figure 1:
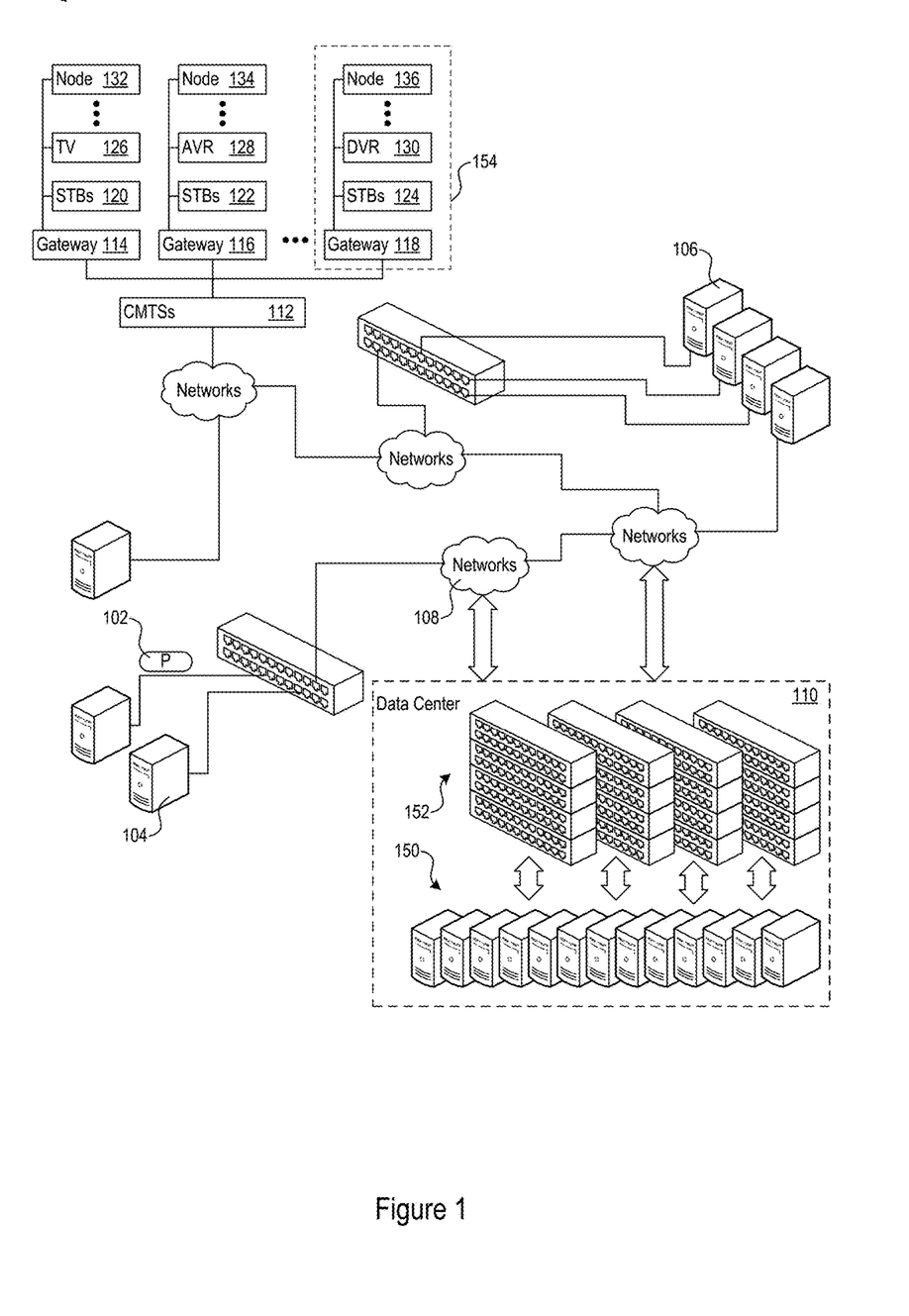
FIG. 1 shows an example of a network that includes virtual machine hosts connected by network devices.

FIG. 1 shows an example network 100. In the network 100, networking devices route packets (e.g., the packet 102) from sources (e.g., the source 104) to destinations (e.g., the destination 106) across any number and type of networks (e.g., the Ethernet/TCP/IP network 108). The networking devices may take many different forms and may be present in any number. The network 108 may span multiple routers and switches, for instance. Examples of network devices include switches, bridges, routers, and hubs; however other types of networking devices may also be present throughout the network 100.

The network 100 is not limited to any particular implementation or geographic scope. As just a few examples, the network 100 may represent a private company-wide intranet; a wide-area distribution network for cable or satellite television, Internet access, and audio and video streaming; or a global network (e.g., the Internet) of smaller interconnected networks. In that respect, the data center 110 may represent a highly concentrated server installation 150 with attendant network switch and router connectivity 152. The data center 110 may support extremely high volume e-commerce, search engines, cloud storage and cloud services, streaming video or audio services, or any other types of functionality.

In the example in FIG. 1, the network 100 includes operators and providers of cable or satellite television services, telephony services, and Internet services. In that regard, for instance, FIG. 1 shows that the network 100 may include any number of cable modem termination system (CMTSs) 112. The CMTSs 112 may provide service to any number of gateways, e.g., the gateways 114, 116, 118. The gateways may represent cable modems, combined cable modems and wireless routers, or other types of entry point systems into any of a wide variety of locations 154, such as homes, offices, schools, and government buildings. The network 100 may include other types of termination systems and gateways. For example, the network 100 may include digital subscriber line (DSL) termination systems and DSL modems that function as the entry points into homes, offices, or other locations.

At any given location, the gateway may connect to any number of any type of node. In the example of FIG. 1, the nodes include set top boxes (STBs), e.g., the STBs 120, 122, 124. Other examples of nodes include network connected smart TVs 126, audio/video receivers 128, digital video recorders (DVRs) 130, streaming media players 132, gaming systems 134, computer systems 136, and physical media (e.g., BluRay) players. The nodes may represent any type of customer premises equipment (CPE).

Figure 2:
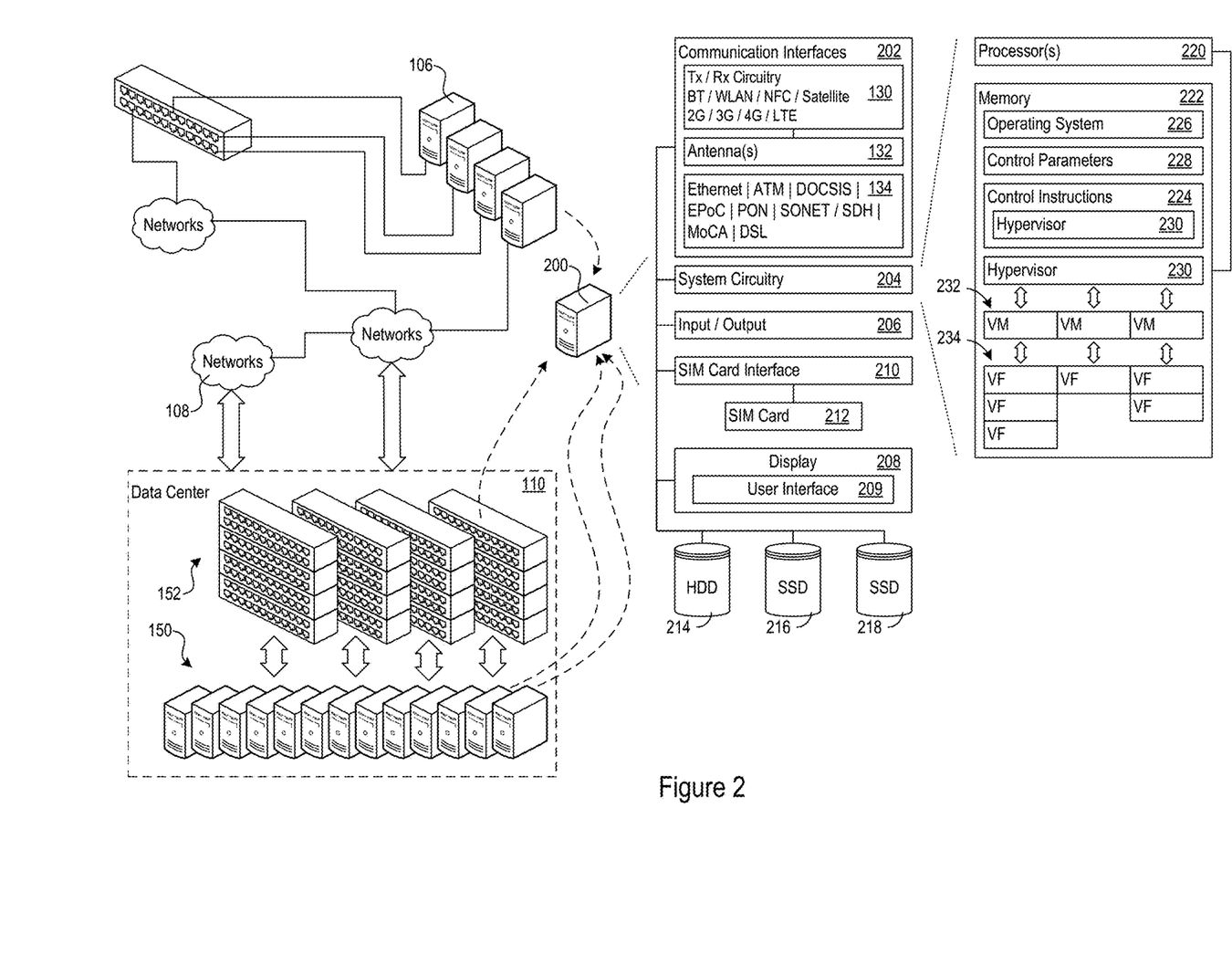
FIG. 2 shows a virtual machine host configured to execute virtual machines and virtual functions.

FIG. 2 shows a virtual machine host 200 ("host") configured to execute virtual machines and virtual functions. Any of the devices in the network 100 may be hosts, including the nodes, gateways, CMTSs, switches, servers, sources, and destinations. The hosts provide an environment in which any selected functionality may run, may be reachable through the network 100, and may form all or part of a chain of functionality to accomplish any defined processing or content delivery task. The functionality may be virtual in the sense that, for example, the virtual functions implement, as software instances running on the hosts, functions that were in the past executed with dedicated hardware.

In FIG. 2, the host 200 includes one or more communication interfaces 202, system circuitry 204, input/output interfaces 206, and a display 208 on which the host 200 generates a user interface 209. When the communication interfaces 202 support cellular connectivity, the host 200 may also include a SIM card interface 210 and SIM card 212. The host 200 also includes storage devices, such as hard disk drives 214 (HDDs) and solid state disk drives 216, 218 (SDDs).

The user interface 209 and the input/output interfaces 206 may include a graphical user interface (GUI), touch sensitive display, voice or facial recognition inputs, buttons, switches, speakers and other user interface elements. Additional examples of the input/output interfaces 206 include microphones, video and still image cameras, headset and microphone input/output jacks, Universal Serial Bus (USB) connectors, memory card slots, and other types of inputs. The input/output interfaces 206 may further include magnetic or optical media interfaces (e.g., a CDROM or DVD drive), serial and parallel bus interfaces, and keyboard and mouse interfaces.

The system circuitry 204 may include any combination of hardware, software, firmware, or other logic. The system circuitry 204 may be implemented, for example, with one or more systems on a chip (SoC), application specific integrated circuits (ASIC), discrete analog and digital circuits, and other circuitry. The system circuitry 204 is part of the implementation of any desired functionality in the host 200. In that regard, the system circuitry 204 may include circuitry that facilitates, as just a few examples, running virtual machines, running virtual functions, routing packets between the virtual machines and the network 100, and switching packets between the virtual machines.

As just one example, the system circuitry 204 may include one or more processors 220 and memories 222. The memory 222 and storage devices 214, 216 store, for example, control instructions 224 and an operating system 226. The processor 220 executes the control instructions 224 and the operating system 226 to carry out any desired functionality for the host 200. The control parameters 228 provide and specify configuration and operating options for the control instructions 224, operating system 226, and other functionality of the host 200.

In some implementations, the control instructions 224 include a hypervisor 230. The hypervisor 230 provides a supervising software environment that executes one or more virtual machines (VMs), virtual switches, virtual firewalls, virtual operating systems, virtual network interface cards (NICs), or any other desired virtualization components. In other implementations, the host 200 is a bare-metal virtualization host. That is, the host 200 need not execute a separate operating system 226 on top of which the hypervisor 230 runs. Instead, the hypervisor 230 may directly communicate with and control the physical hardware resources in the host 200 without supervision or intervention through a separate operating system.

The host 200 may execute any number of VMs 232. Each VM may execute any number or type of virtual functions (VFs) 234. The VFs may be software implementations of any desired functionality, ranging, for instance, from highly specialized network functions to general purpose processing functions.

As just a few examples of network functions, the VFs may implement network firewalls, messaging spam filters, and network address translators. As other example of processing functions, the VFs may implement audio and video encoders and transcoders, digital rights management (DRM) processing, database lookups, e-commerce transaction processing (e.g., billing and payment), web-hosting, content management, context driven advertising, and security processing such as High-bandwidth Digital Content Protection (HDCP) and Digital Transmission Content Protection (DTCP-IP) processing. Additional examples of VFs include audio, video, and image compression and decompression, such as H.264, MPG, and MP4 compression and decompression; audio and video pre- and post-processing, server functionality such as video on demand servers, DVR servers; over the top (OTT) servers; secure key storage, generation, and application, and 2D and 3D graphics rendering.

Figure 3:
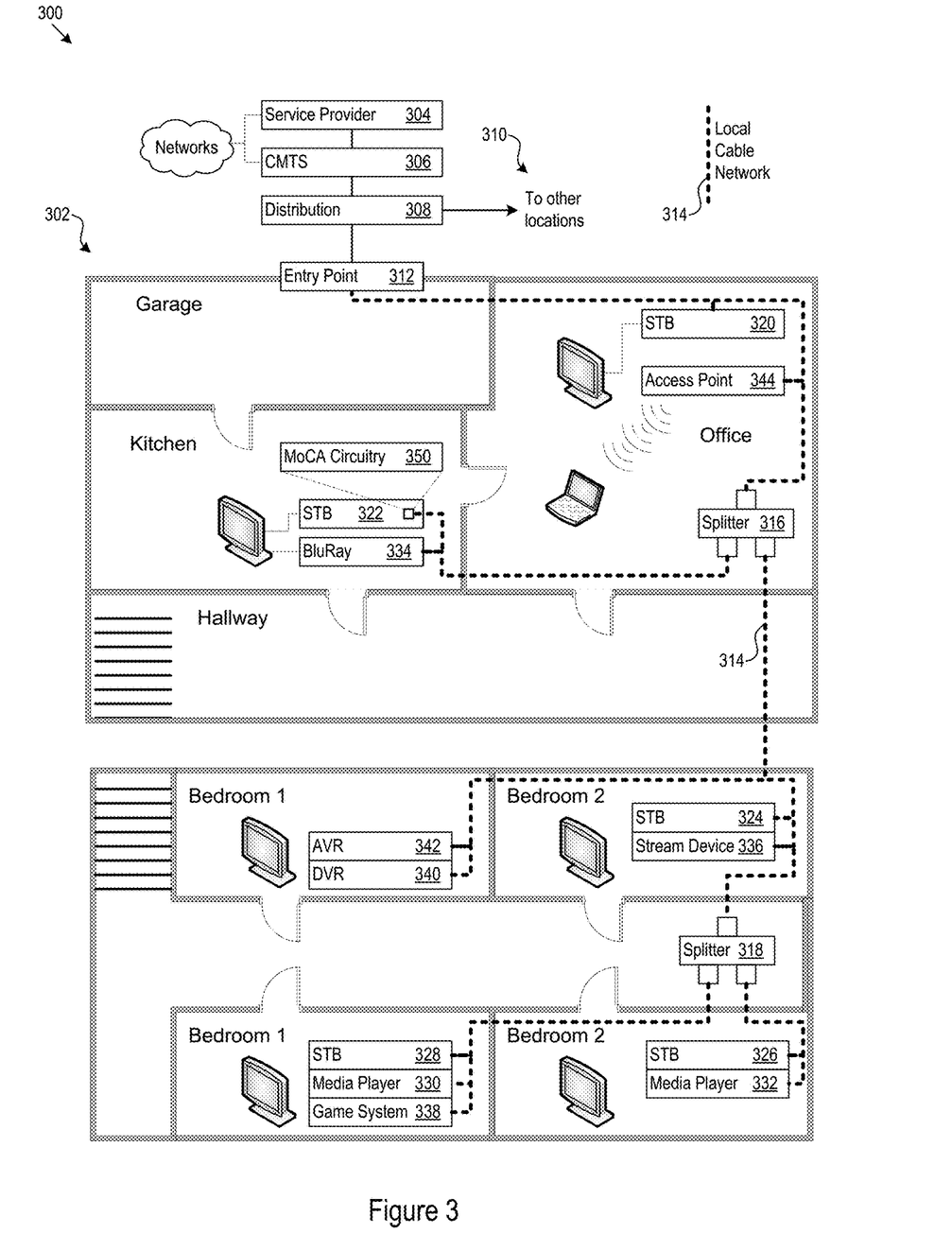
FIG. 3 shows an example cable distribution network within a home.

FIG. 3 shows an example cable distribution network 300 reaching to a home 302. The home 302 is an example of a predetermined service location to which the service provider 304 provides, e.g., broadband networking, audio/video distribution or other services. The service provider 304 may be an Internet service provider, cable TV service provider, cloud storage or cloud services provider, streaming video or audio service provider, or any other type of service provider. Accordingly, the service provider may provide program content to the service location over broadband links such as cable connections, T1 or other network links whether optical or wired, satellite links, or telephone lines.

FIG. 3 provides an example context for explaining certain network architecture and techniques for network topology adaptation. The architecture and techniques are applicable to other networks in other service locations. That is, FIG. 3 provides just one explanatory example for the implementation and operation of the architecture and techniques.

In the example of FIG. 3, the service provider 304 transmits and receives content through a CMTS 306 and the distribution network 308. The distribution network 308 may be a cable distribution, e.g., of RG7 coaxial cable, that runs to the home 302 and potentially many other locations 310. The content provider network enters the home 302 at the entry point 312.

From the entry point 312, the local cable network 314 extends through the home 302. Physically, the local cable network 314 takes the form of a tree, with the entry point 312 at the root. Through the home 302, the local cable network 314 branches, e.g., through the splitters 316 and 318, taps, and other connections, to connect many different devices to the local cable network 314. In this example, the devices include STBs 320, 322, 324, 326, and 328. Additional devices include the media players 330 and 332, and as a specific instance the BluRay player 334. The network within the home 302 also includes a streaming device 336, e.g., an Internet radio streaming device and a game system 338. The digital video recorder (DVR) 340 and audio/video receiver (AVR) 342 are additional examples of network devices, as is the WiFi access point 344.

There may be many other types of devices that connect to the local cable network 314, e.g., printers, televisions, or scanners. Each of the devices, e.g., the STB 322, may include or may be connected to, for instance, multimedia over coax alliance (MoCA) circuitry, e.g., the MoCA circuitry 350. The MoCA circuitry includes the electrical and physical connections, protocols, and operational functionality according to MoCA 1.0, 2.0, or other MoCA standard. Accordingly, any of the devices may be MoCA nodes on a MoCA network. MoCA implementation circuitry is available from, e.g., Broadcom of Irvine Calif., and examples include the BCM3450, BCM7025, BCM7408, BCM7410, BCM7418, BCM7420, BCM7421, BCM7422, and BCM7425 SoCs. The devices may include additional functionality according to the architecture and techniques described below.

Figure 4:
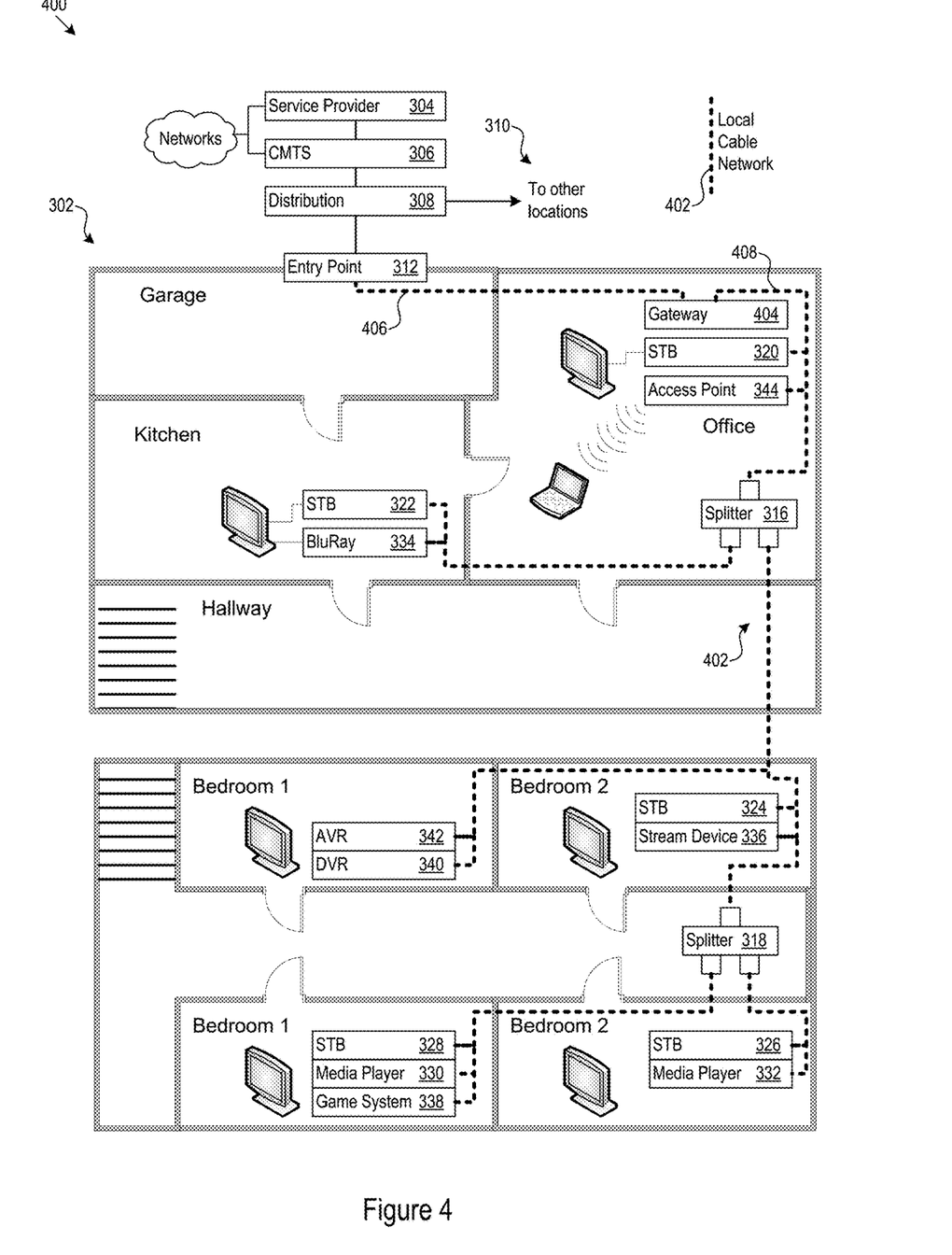
FIG. 4 shows an example of adding a gateway into the cable distribution network shown in FIG. 3.

FIG. 4 shows another view of a cable distribution network 400 reaching to the home 302. FIG. 4 includes a local cable network 402 within the home 302. In this architecture, the local cable network 402 includes a gateway 404. The gateway 404 receives and terminates the incoming network connection 406 (e.g., an incoming cable feed) after the entry point 312, and includes a separate cable connection 408 to the remainder of the local cable network 402. Note that the local cable network 402 retains intact the structure of the local cable network 314 shown in FIG. 3. However, the gateway 404 has been added.

Figure 5:
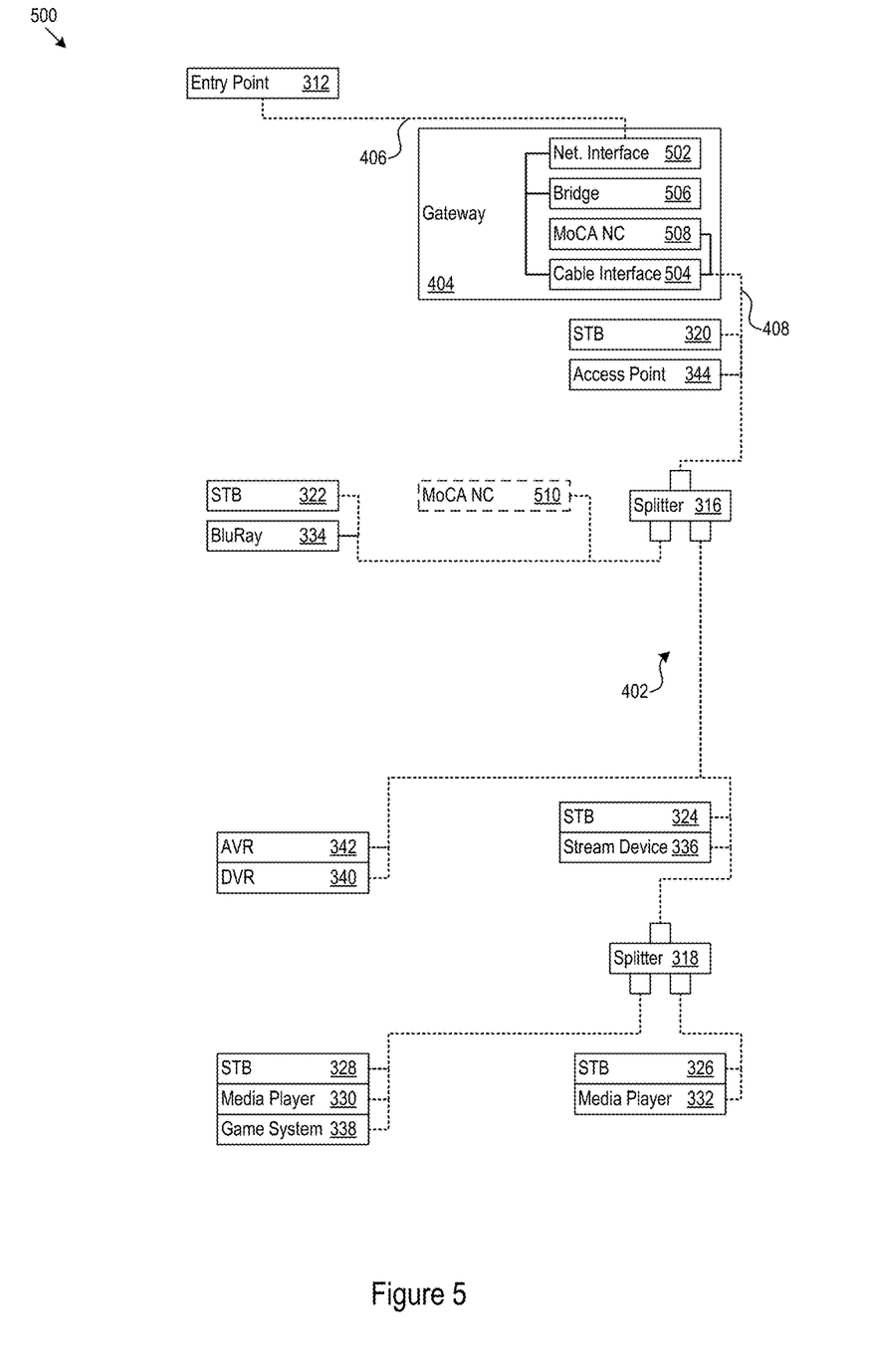
FIG. 5 shows the physical tree topology of the cable distribution network.

FIG. 5 shows the physical tree topology 500 of the local cable network 402. The local cable network 402 branches from the root at the entry point 312 to connect many difference devices present at the home 302. FIG. 5 also shows one implementation example of the gateway 404 in more detail.

The gateway 404 may be, for instance, a single device for installation at any predetermined service location. The gateway 404 includes a content provider network interface 502, e.g., a cable termination. The network interface 502 terminates a content provider connection, e.g., the incoming cable feed 406, to the predetermined service location.

The gateway 404 also includes a network interface, e.g., the cable interface 504, to the local cable network 402. The local cable network 402 is a MoCA network of MoCA nodes, such as the devices 320-344. FIG. 5 shows that the network of MoCA nodes is organized in a physical tree network topology, branching out from the root at the entry point 312.

The gateway 404 also includes a network bridge 506. The network bridge 506 acts as a connector between the content provider network interface 502 and the cable interface 504. In addition, the gateway 404 includes a MoCA network controller (NC) 508 between with the network interface 502 and the cable interface 504.

The MoCA NC 508 acts as a central MoCA network controller to admit new members to network. For admitted members, the MoCA NC 508 acts as the scheduler for the network. In that respect, the MoCA nodes communicate with the MoCA NC 508 to request bandwidth on the network. The MoCA NC 508 then allocates and organizes transmit slots, priorities, and manages quality of service. In this manner, the MoCA NC 508 is able to reserve bandwidth and manage latency for any traffic flows involving any of the MoCA nodes and the MoCA NC 508.

The MoCA NC 508 also implements bandwidth allocation across what are referred to as MAP cycles. In a MAP cycle, selected MoCA nodes are allowed to send a reservation request (RR) message to the MoCA NC 508. The RR message is a request for time slots to send data to other MoCA nodes. The MoCA NC 508 receives the RR messages and grants slots in the next MAP cycle for as many MoCA nodes as it can. The MoCA NC 508 also sends the bandwidth schedule of allocated bandwidth to all of the MoCA nodes in the next MAP message. As a result, the MoCA nodes receive the bandwidth schedule and know when to send and when to receive data during the upcoming MAP cycle.

The gateway 404 shown in FIG. 4 is just one implementation example used below for the purposes of discussion. In other implementations, the gateway 404 and the MoCA NC 508 are separate physical MoCA nodes. That is, the MoCA NC may be any other node on the network other than the gateway, such as the node 510. As will be described in more detail below, the MoCA NC includes transceivers for transmitting and receiving OFDMA transmissions from other nodes.

Figure 6:
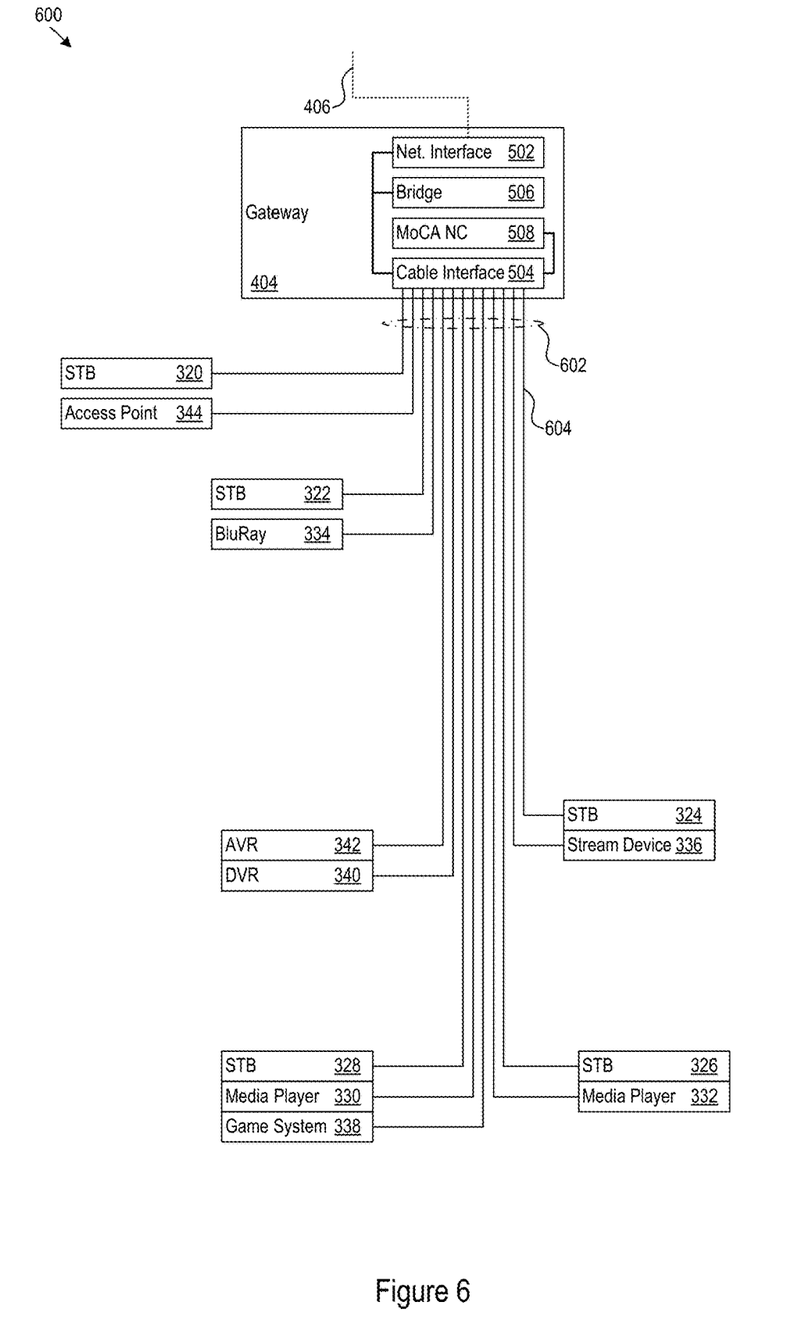
FIG. 6 shows a logical star topology implemented over the physical tree topology of the cable distribution network.

FIG. 6 shows a logical star topology 600 implemented over the physical tree topology of the local cable network 402. The cable interface 504 communicates over the local cable network 402, but allocates bandwidth and directs communications between the MoCA NC 508 and the MoCA nodes, and between different MoCA nodes as a logical star topology, over the logical NC to MoCA node links 602. The logical links 602 may represent, for example, fixed or variable orthogonal frequency division multiplexing (OFDM) or orthogonal frequency division multiple access (OFDMA) bandwidth allocations for bi-directional communication between any of the MoCA nodes, including the MoCA NC 508.

The MoCA NC 508 defines the bandwidth allocations over the physical cable medium of the local cable network 402. As a specific example, the logical link 604 may represent a portion of available spectrum at selected times on the physical medium of the local cable network 402. As a particular example, the logical link 604 connects the STB 324 to the cable interface 504.

Figure 7:
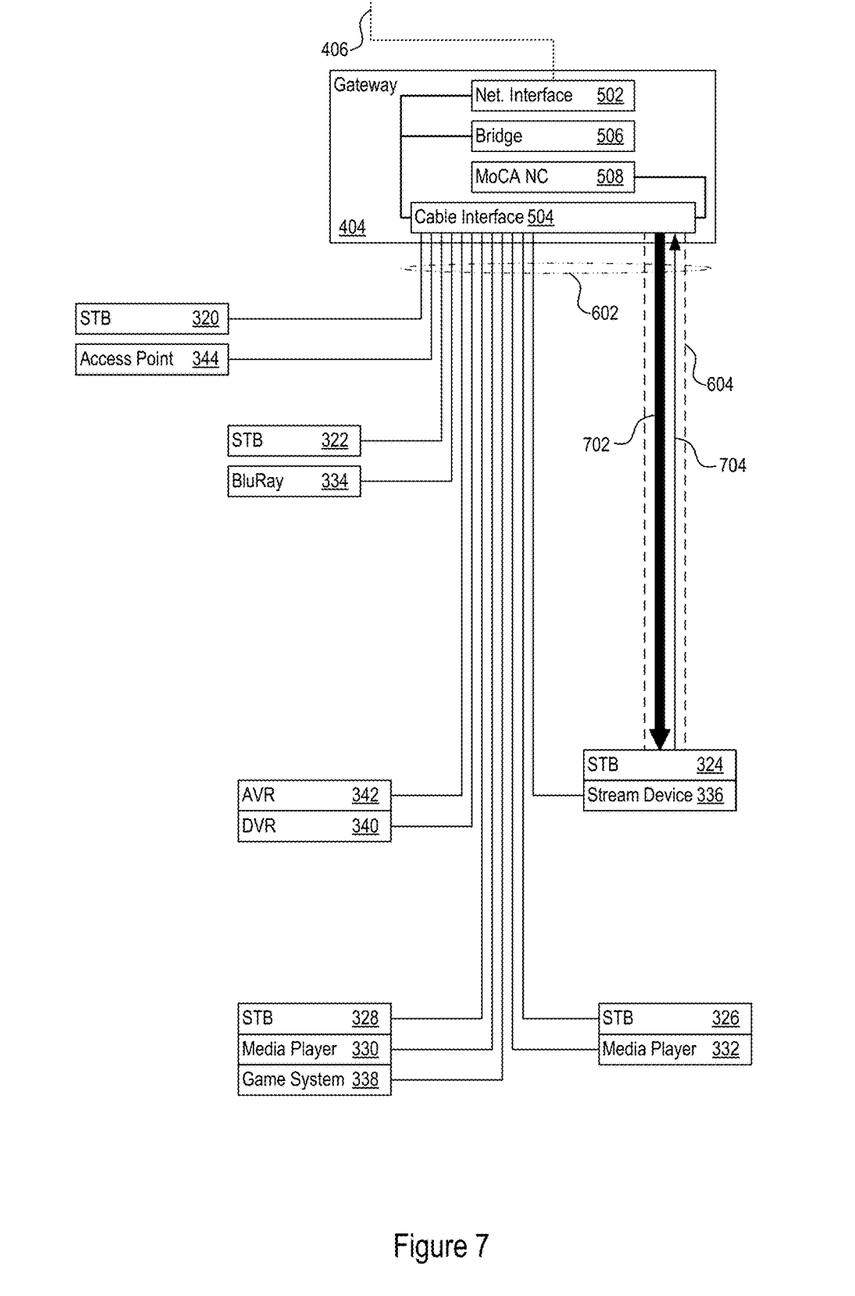
FIG. 7 shows a logical star topology implemented over the physical tree topology of the cable distribution network.

FIG. 7 also shows a logical star topology 700 implemented over the physical tree topology of the cable distribution network. In FIG. 7, the view of the logical link 604 is expanded to show the asymmetric provisioning of bandwidth for the downlink 702 as compared to the uplink 704. The downlink 702 runs from the gateway 404 to the MoCA nodes, while the uplink runs from the MoCA nodes to the gateway 404. The MoCA NC 508 may generally allocate greater bandwidth to the downlink 702, to support high bandwidth content delivery from the gateway 404 to the MoCA nodes. For instance, the gateway 404 may receive high bandwidth video content from the service provider 304, and distribute the video content or other data content that may arrive from the access network over the downlinks to the MoCA nodes that have requested the video content. The MoCA nodes may use the relatively narrower bandwidth uplinks to communicate what is typically lower bandwidth traffic back to the gateway 404. Such lower bandwidth traffic may include, transmission control protocol (TCP) acknowledgements (ACKs), requests for content, and other traffic.

Figure 8:
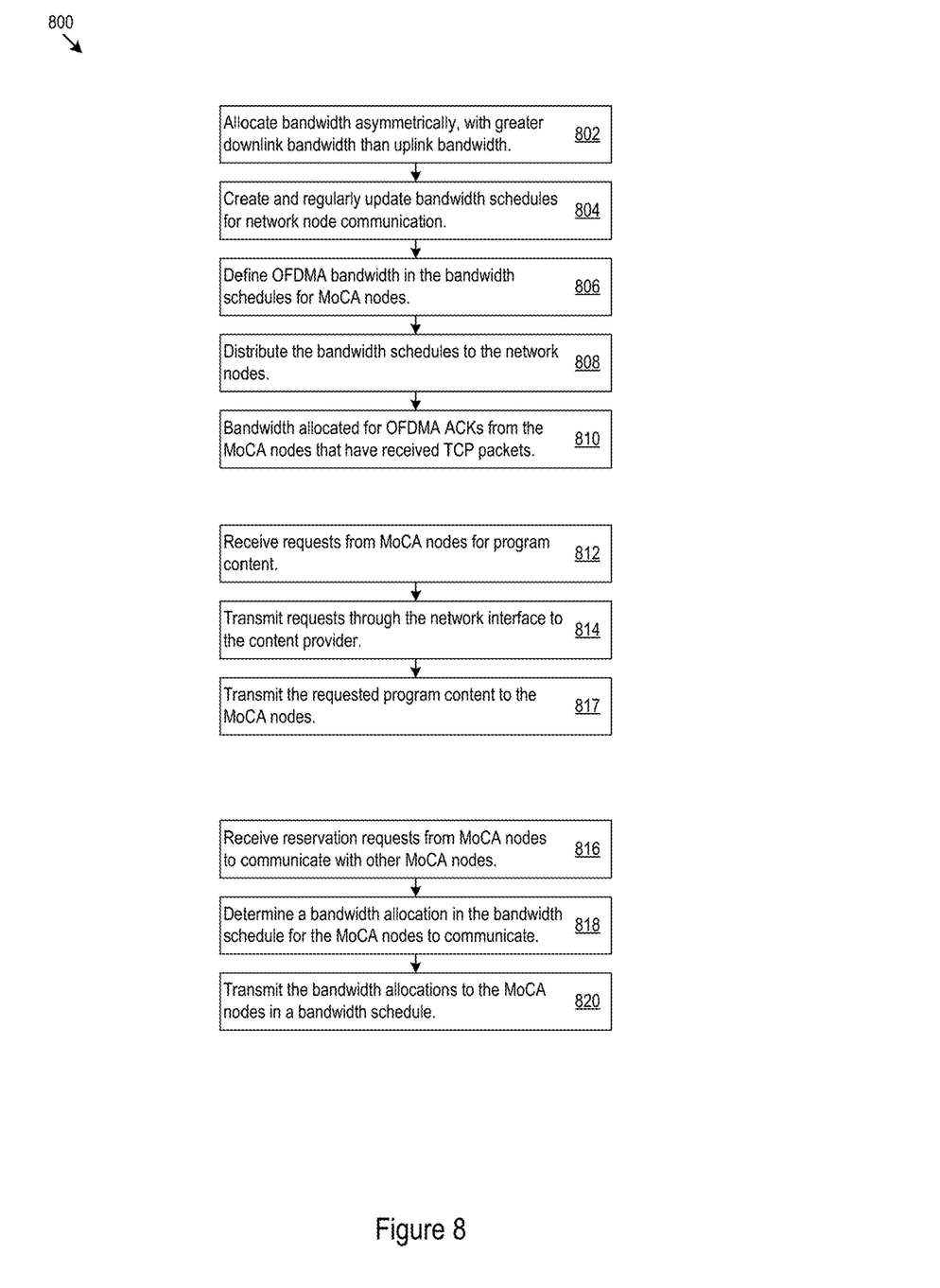
FIG. 8 shows logic for implementing a logical star topology over a physical tree topology of the cable distribution network.
Figure 9:
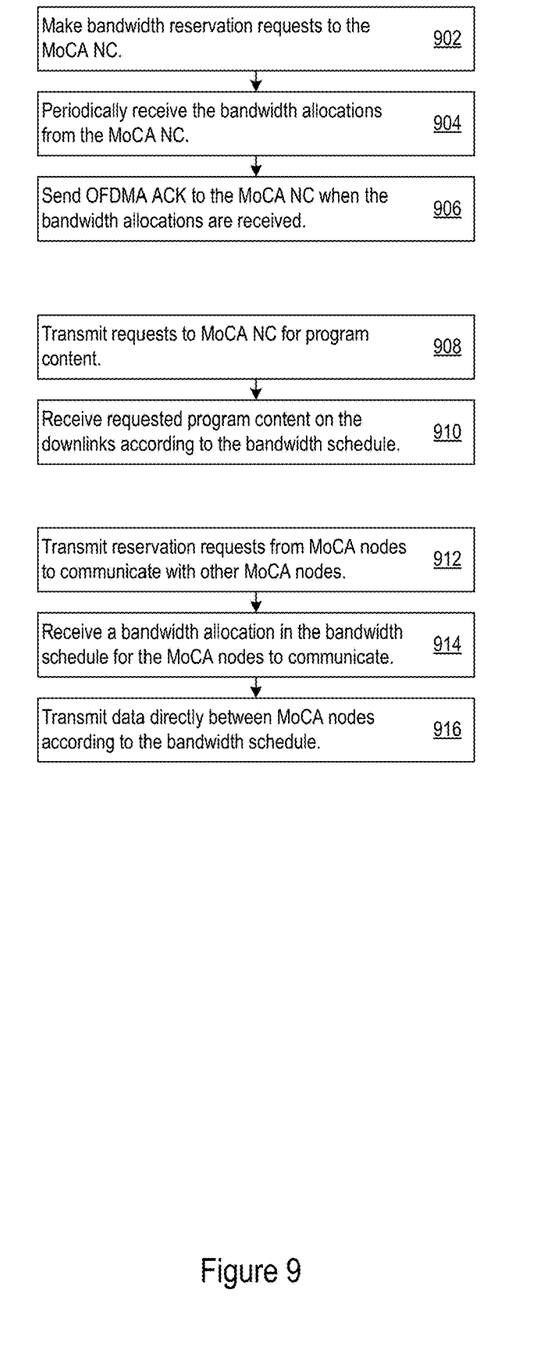
FIG. 9 shows logic for a MoCA node, other than a MoCA NC, for implementing a logical star topology over a physical tree topology of the cable distribution network

Below, FIGS. 6 and 7 are discussed with reference also to FIGS. 8 and 9. FIG. 8 shows several sets of logic 800 for a implementing a logical star topology over a physical tree topology of a cable distribution network. The counterpart FIG. 9 shows sets of logic 900 for implementing a logical star topology over a physical tree topology of a cable distribution network.

The MoCA NC 508 provides asymmetric uplink bandwidth and downlink bandwidth (802). The downlink bandwidth may be allocated for gateway 404 to MoCA node communication, such as for transmitting audio and video content from the gateway 404 to the other MoCA nodes. The uplink bandwidth may be allocated for MoCA node to gateway 404 communications. The communications may carry any type of data in packets, and the packets may or may not be limited to being smaller than a predetermined size threshold, e.g., for communicating TCP ACKs, control or command data, or any other type of data.

In that respect, the techniques described in this document provide a more general way of using OFDMA, by supporting any type of packet not necessarily under the size threshold, including ACK packets. By doing so, the techniques allow a very flexible general purpose data channel to be defined over OFDMA for whatever purpose the MoCA nodes may find useful in any particular implementation. Note that different OFDMA frames can share traffic from different MoCA nodes, with the packets in the traffic being any mix of any size or packet type, e.g., command and control packets as well as ACK packets from different MoCA nodes in the same OFDMA frame.

The MoCA NC 508 creates and regularly updates and sends a bandwidth schedule for MoCA nodes communicating on the MoCA network (804). The bandwidth schedule may be a map of transmit opportunities, e.g., expressed as OFDM transmission slot allocations, for the MoCA nodes, including the MoCA NC 508. The bandwidth schedule may determine allocated bandwidth for the next one millisecond, or for any other time interval. In this respect, the MoCA NC 608 may implement the MoCA Media Access Plan (MAP)

operations and respond to reservation requests made by MoCA nodes for bandwidth allocations (902).

The MoCA NC 508 also defines OFDMA bandwidth for the MoCA nodes in the bandwidth schedule (806). In this regard, the MoCA NC 508 may assign specific frequency subcarriers from the available set of subcarriers to specific MoCA nodes to use to transmit. In some implementations, the MoCA nodes may transmit ACKs of having received any TCP packets, e.g., an ACK for about every two TCP packets received. In other implementations, the MoCA nodes may transmit any predetermined packet types using the OFDMA allocations. In some implementations, the packet types may include any packet that is shorter than a predetermined size threshold.

The MoCA NC 508 distributes the bandwidth schedule from the MoCA NC 508 to the MoCA nodes (808). Accordingly, the MoCA nodes receive the bandwidth schedules (904) and are informed of their transmit opportunities on the local cable network 402, as well as their OFDMA allocation for uplink traffic.

The MoCA NC 508 thereby allocates bandwidth for OFDMA communication of TCP ACKs that other MoCA nodes need to send in response to those nodes having received TCP packets (810). The other MoCA nodes send the ACKs (906) to acknowledge receipt of, for example, TCP packets from the gateway 404 that carry video data, audio data, bandwidth schedules, or any other type of data. Providing an OFDMA allocation for ACKs allows multiple MoCA nodes to transmit ACKs in parallel, without having to make a separate ACK transmission to the gateway 404. As a result, the ACKs are sent and received much more efficiently, and without the delays associated with serial ACKs.

In more detail, OFDMA transmission eliminates the overhead involved with the interframe gap (IFG) and preamble ordinarily required for each OFDM ACK transmission. The OFMDA frames shared by multiple transmitters may be supported by a single IFG and preamble. In contrast, the OFDMA transmission technique avoids having each MoCA node send reservation requests to the MoCA NC 508 for bandwidth for their TCP ACKs. When multiple MoCA nodes simultaneously receive TCP traffic from the gateway 404 and need to send ACKs, the MoCA NC 508 allocates transmission opportunities to each requesting MoCA node.

Each transmission opportunity starts with an IFG and a preamble with a duration of ~17 μs. When a larger number of MoCA nodes are transmitting ACKs, each of the MoCA nodes requires the 17 μs overhead. If, for instance, 16 MoCA nodes need to send ACKs, then the overhead is 272 μs on each MAP cycle. With an average MAP cycle size of, e.g., 1250 μs, the overhead is more than 21%.

As noted above, however, the MoCA NC 508 allocates OFDMA bandwidth for the ACKs. As a result, and continuing the example above, a single 17 μs IFG overhead could support all 16 nodes, which transmit in parallel over OFDMA. The resultant overhead is less than 1.5%. The techniques describe above result in a significant reduction in overhead in many real-world communication scenarios. Note that the MoCA nodes and gateway 404 may also use OFDMA in the downstream direction with a similar gain in overhead.

The gateway 404 uses network bandwidth to communicate program content to the MoCA nodes that was received at the gateway 404 through the bridge 506 to the service provider network. The gateway 404 may receive content requests from the MoCA nodes (812, 908), and send those content requests over the service provider network to the source of the requested content (814). The requested program content returns to the gateway 404 over the service provider network. The service provider network thereby transports, e.g., streaming video or audio from content providers to the MoCA nodes (817, 910).

The gateway 404 acts as the termination point into the service location for the service provider 304. In some implementations, the gateway 404 may also implement the MoCA NC 508 (e.g., in a single device with the cable interface 504, bridge 506, and network interface 502), while in other implementations the MoCA NC 508 may be a physically distinct device. In the combined implementation where the gateway 404 implements the MoCA NC 508, the gateway 404 can control the available bandwidth on the local cable network 402. In particular, the MoCA NC 508 may allocate bandwidth for the selective distribution, for example, of many Mbps of video and audio streams to the MoCA nodes.

In that regard, the gateway 404 may receive multimedia content through the content provider network interface 502. The content may be received, for instance, in response to requests from the MoCA nodes for content. The gateway 404 communicates the program content received from the network interface 502 to the MoCA nodes. As explained above, the MoCA NC 508 coordinates the distribution according to a logical star network topology using OFDMA links, over the physical tree network topology.

The MoCA NC 508 may also receive reservation requests from a MoCA node to communicate directly with a different MoCA node (816, 912). In response, the MoCA NC 508 may provide a bandwidth allocation, in the bandwidth schedule, for the communication between the MoCA nodes (818) and transmit the bandwidth allocations to the MoCA nodes in a bandwidth schedule (820, 914). The MoCA nodes may then transmit data between each other according to the bandwidth schedule (916). These bandwidth allocations may be of any type, including relatively high bandwidth OFDM allocations or lower bandwidth uplink bandwidth allocations.

Figure 10:
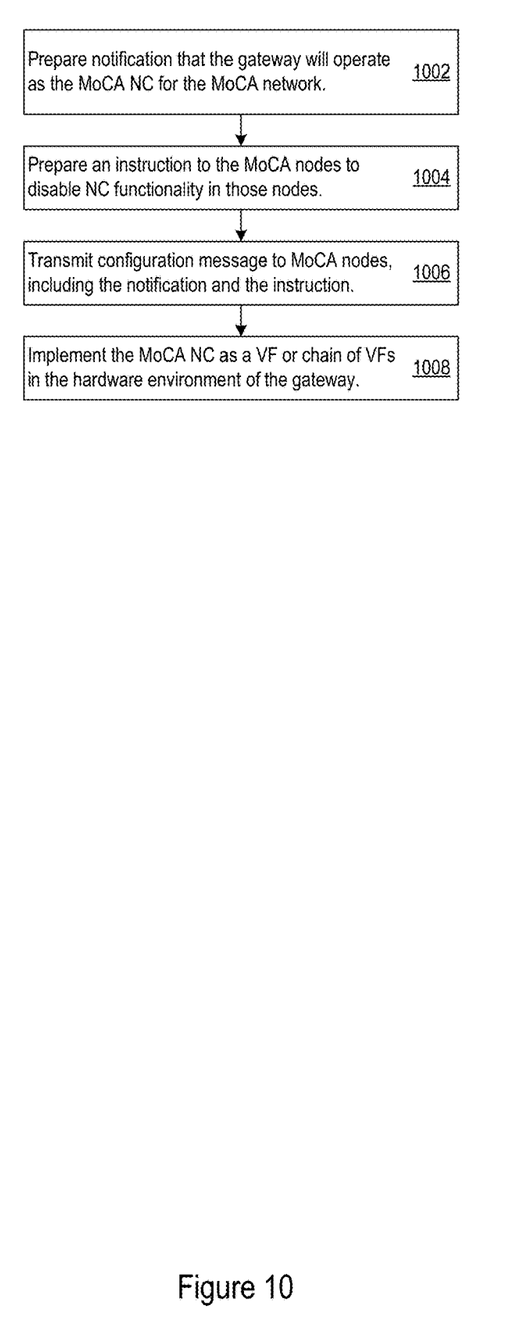
FIG. 10 shows logic for establishing a gateway that terminates a cable distribution network.

FIG. 10 shows logic 1000 for establishing a gateway with MoCA NC functionality that terminates a cable distribution network. In some implementations, the MoCA nodes may include sufficient hardware and software capabilities and functionality to allow the MoCA node to implement the MoCA NC. This functionality is not necessarily needed in implementations where the single gateway 404 is installed and terminates the service provider network.

Accordingly, when the gateway 404 is added to the local cable network 402, the circuitry in the gateway 404 may take configuration actions on the MoCA nodes. For instance, the gateway 404 may request admission to the MoCA network, and may prepare a notification that the circuitry in the gateway 404, will operate as the MoCA NC for the local cable network 402 (1002). The gateway 404 may also prepare an instruction to the MoCA nodes to disable NC functionality in those nodes (1004). The gateway 404 transmits a configuration message to the MoCA nodes, including the notification and the instruction (1006).

As such, rather than having any MoCA node dynamically selected to become the NC, the gateway 404 may coordinate with the MoCA nodes so that the gateway 404 provides the MoCA NC 508 as the centralized NC. The gateway 404 terminates the incoming service provider network, and thereby is able to manage the totality of the available bandwidth of the local cable network 402 through the MoCA NC 508.

With reference to FIGS. 1 and 2, in some implementations, the functionality of the MoCA NC 508 is virtualized in the gateway 404. That is, a Virtual Function (VF) or chain of VFs may implement the MoCA NC 508 (1008), with the NC functionality effectively moved or reassigned from any given MoCA node into the gateway 404. The gateway 404 executes the VFs in the hardware environment within gateway 404, e.g., by instantiating a Virtual Machine to execute the MoCA NC functionality. As such, the gateway 404 may dynamically instantiate and execute (and tear down and stop executing) the role of the MoCA NC 508 in response to network operator commands, when there is sufficient processing power and processing resources available within the gateway 404 to do so, or when other pre-determined conditions are met.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising: a service provider network interface; and a cable interface to a multimedia over coax alliance (MoCA) network of MoCA nodes, the MoCA network of MoCA nodes organized in a physical tree network topology; and network controller circuitry in communication with the service provider network interface, the network controller circuitry configured to:

execute as a MoCA network controller (NC) for the MoCA nodes in the MoCA network;

implement bandwidth scheduling for the MoCA nodes as the MoCA network controller, including asymmetric provisioning of bandwidth to provide gateway to MoCA node downlink bandwidth for broadband program content that is greater than MoCA node to gateway uplink bandwidth;

receive the broadband program content through the service provider network interface; and communicate the broadband program content received from the service provider network interface to the MoCA nodes using the downlink bandwidth, according to a logical star network topology over the physical tree network topology.

2. The system of claim 1, where:

the service provider network interface is configured to:
terminate a broadband service provider connection at a location where the system is located; and the network controller circuitry is configured to:
provide a gateway connection for a broadband service provider to the MoCA network.

3. The system of claim 2, where:

the network controller circuitry is configured to receive the broadband program content from the broadband service provider.

4. The system of claim 1, where the network controller circuitry comprises a MoCA NC configured to:

create a media access plan of assigned bandwidth for the MoCA nodes; and transmit the media access plan to the MoCA nodes.

5. The system of claim 4, where the network controller circuitry is further configured to:

receive acknowledgement from the MoCA nodes of receiving the broadband program content.

6. The system of claim 4, where the network controller circuitry is further configured to:

receive acknowledgement from the MoCA nodes of receiving the broadband program content in orthogonal frequency division multiple access (OFDMA) communications from the MoCA nodes.

7. The system of claim 6, where the MoCA NC is further configured to:

allocate OFDMA bandwidth for the MoCA nodes in the media access plan.

8. The system of claim 7, where:

the MoCA NC is configured to allocate the OFDMA bandwidth for communication of general purpose data packets.

9. The system of claim 7, where:

the MoCA NC is configured to allocate the OFDMA bandwidth for communication of general purpose data packets under a pre-defined size threshold.

10. The system of claim 7, where:

the MoCA NC is configured to allocate the OFDMA bandwidth for communication of transmission control protocol (TCP) acknowledgements.

11. A method comprising: in a gateway device serving a predetermined location:

terminating a content service provider network connection entering the predetermined location;
providing a local network interface to a multimedia over coax alliance (MoCA) network of MoCA nodes, the MoCA network of MoCA nodes organized in a physical tree network topology at the predetermined location;
implementing, in the gateway device, a network controller (NC), and, with the NC:
transmitting a configuration message to the MoCA nodes, the configuration message specifying that the gateway device will operate as the MoCA NC for the MoCA network, and to disable NC functionality in the MoCA nodes;
providing MoCA NC functionality for the MoCA nodes in the MoCA network;
creating a bandwidth schedule for the MoCA nodes in the MoCA network; providing downlink bandwidth from the gateway device to the MoCA nodes that exceeds uplink bandwidth from the MoCA nodes to the gateway device;
distributing the bandwidth schedule from the NC to the MoCA nodes; defining orthogonal frequency division multiple access (OFDMA) bandwidth for the MoCA nodes in the bandwidth schedule; and
receiving acknowledgments (ACKs) from the MoCA nodes of having received network packets sent by the gateway device, including receiving the ACKs over the OFDMA bandwidth defined in the bandwidth schedule.

12. The method of claim 11, further comprising:
establishing a packet size threshold; and
defining the OFDMA bandwidth in the bandwidth schedule for uplink packets shorter than the packet size threshold that are sent from the MoCA nodes to the gateway device, including the ACKs.

13. The method of claim 12, where receiving ACKs comprises:
receiving ACKs in ACK packets that are shorter than the packet size threshold.

14. The method of claim 12, further comprising:
receiving program content requests from requesting MoCA nodes; and
transmitting the program content requests through the content service provider network connection.

15. The method of claim 14, further comprising:
receiving program content packets from the content service provider network connection; and
distributing the program content packets to the requesting MoCA nodes.

16. The method of claim 11, further comprising:
with the NC, receiving a request from a first MoCA node to communicate to a second MoCA node among the MoCA nodes in the MoCA network; and
creating a bandwidth assignment for the first MoCA node for communicating to the second MoCA node.

17. A system comprising:
in a single gateway device for installation at a predetermined service location:
a content provider network interface that terminates a content provider connection to the predetermined service location;
a cable interface to a multimedia over coax alliance (MoCA) network of MoCA nodes, the MoCA network of MoCA nodes organized in a physical tree network topology;
a network bridge between the content provider network interface and the cable interface; and
a MoCA network controller (NC) in communication with the cable interface and the network bridge, the MoCA NC configured to:
provide asymmetric uplink bandwidth and downlink bandwidth, the downlink bandwidth for gateway device to MoCA node communications, and the uplink bandwidth for MoCA node to gateway device communications;
create a bandwidth schedule for MoCA node communications on the MoCA network;
define orthogonal frequency division multiple access (OFDMA) bandwidth for the MoCA nodes in the bandwidth schedule;
distribute the bandwidth schedule from the NC to the MoCA nodes; receive, over the OFDMA bandwidth defined in the bandwidth schedule, acknowledgments (ACKs) of having received transmission control protocol packets from the gateway device;
receive program content through the content provider network interface; and
communicate the program content received from the content provider network interface to the MoCA nodes over the downlink bandwidth according to a logical star network topology over the physical tree network topology.

18. The system of claim 17, where the MoCA NC is further configured to:
receive a reservation request from a first MoCA node to communicate to a second MoCA node among the MoCA nodes in the MoCA network; and
provide a bandwidth allocation, in the bandwidth schedule, for the first MoCA node to communicate with the second MoCA node.

19. The system of claim 17, where the gateway device is further configured to:
transmit a configuration message to the MoCA nodes, the configuration message comprising:
a notification that the gateway device will operate as the MoCA NC for the MoCA network; and
an instruction to disable NC functionality in the MoCA nodes.

* * * * *